Jan. 23, 1962 VAN RENSSELAER P. SAXE 3,017,972
CONNECTION UNITS
Original Filed Dec. 14, 1954

INVENTOR
Van Rensselaer P. Saxe

BY *Ralph Burch*

ATTORNEY

United States Patent Office 3,017,972
Patented Jan. 23, 1962

3,017,972
CONNECTION UNITS
Van Rensselaer P. Saxe, 1701 St. Paul St.,
Baltimore 2, Md.
Continuation of application Ser. No. 475,097, Dec. 14,
1954. This application Nov. 12, 1959, Ser. No. 852,903
4 Claims. (Cl. 189—36)

This invention relates to a connector employed in the erection of structural steel frames and more particularly to a connection unit for joining together metal building elements such as a beam and column disposed at an angle to each other, and is a continuation of my application Serial No. 475,097, filed December 14, 1954, now abandoned.

The features disclosed herein are improvements on the units shown in my prior patents, Nos. 2,231,297; 2,540,408; and 2,624,429 wherein a seat in the form of a U-shaped yoke is attached to one building element for reception of the flange of an angle bracket attached to another building element. In practice owing to the close fit between the flange and its seat, considerable force must be applied when seating the flange to form the connection and it is an object of the present invention to increase the resilience of the flange and its seat so that the connection may be made with considerable less pressure applied to the flange, in much shorter time, and without causing burrs on the flange due to shaving off metal because of the relative yieldability of the yoke and flange.

Another object of the invention resides in providing a connection unit composed of a yoke and interfitting angle bracket flange wherein the resilience of the yoke and flange are increased without reducing the strength of the joint or positive interlocking engagement of the parts.

A further object of the invention is to provide a lug on the column or seat engaging flange with an upwardly facing shoulder which is of greater width than the space between the column face and the juxtaposed inner thinned edge of the resilient yoke to readily interlock therewith.

Other objects and advantages of the invention will be apparent during the course of the following specification.

In the accompanying drawing forming a part of this specification and in which like numerals are employed to designate like parts throughout the same, FIGURE 1 is a side elevation of the connection unit with the parts in position for interfitting engagement.

Similar reference characters designate corresponding parts throughout the several figures of the drawings.

Figure 1:
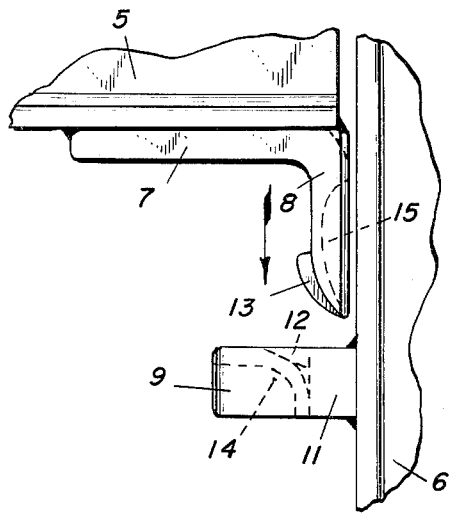
Figure 3:
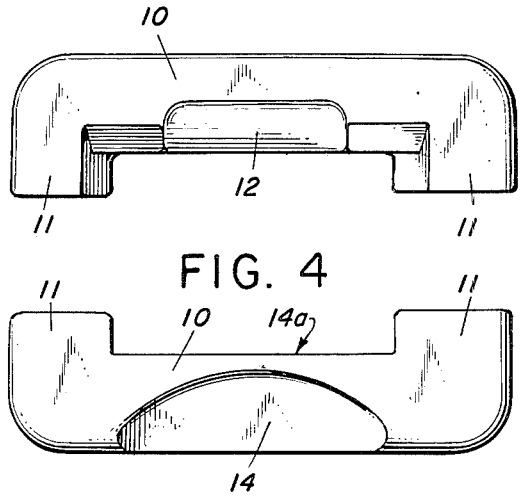
FIGURE 3 is a top plan view of the yoke.
Figure 4:
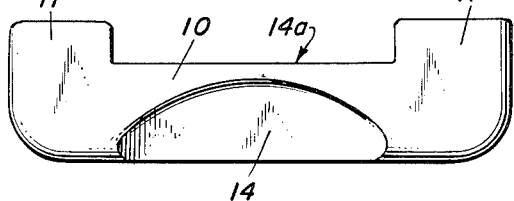
FIGURE 4 is a bottom plan view of the yoke.
Figure 2:
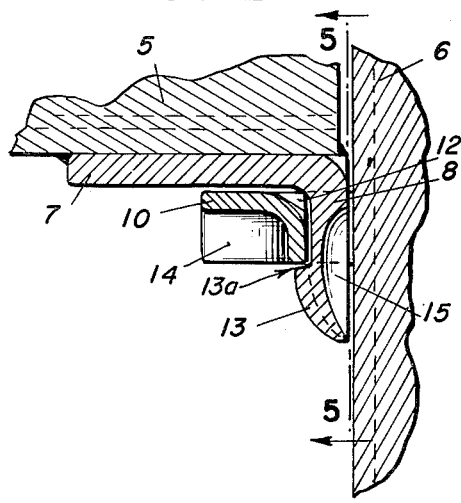
FIGURE 2 is a vertical sectional view of the connection unit with the parts in interfitting engagement.
Figure 5:
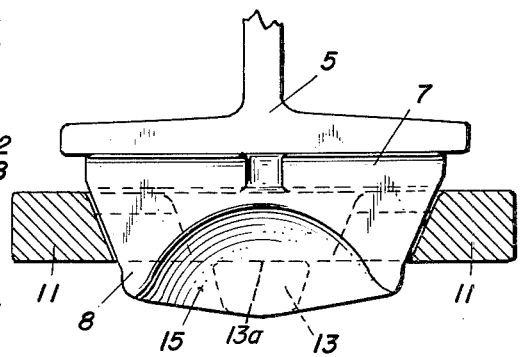
FIGURE 5 is a section taken on line 5—5 of FIGURE 2.
Figure 6:
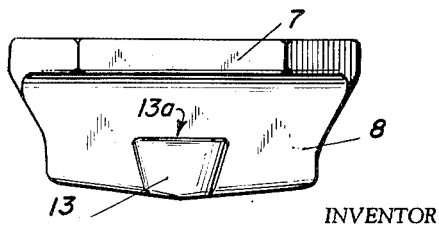
FIGURE 6 is a view of the angle bracket looking towards the inner side of the interlocking flange.

Referring to the drawing wherein for the purpose of illustration a preferred example of the invention is shown, the numerals 5 and 6 denote conventional structural members disposed at right angles to each other with the end of beam 5 in abutting relation to the face of column 6.

The lower face of beam 5, at its end, has secured thereto by welding, the beam attaching leg of a steel angle bracket 7 having a column engaging leg 8 depending from the beam in perpendicular relation to the end thereof. The leg 8 is adapted to engage in a steel yoke 9 secured by welding to the vertical face of the column 6.

The yoke is substantially U-shaped and includes a body formed of a bar portion 10 having top, bottom, inner and outer side walls and arms 11 offset from the inner wall to the same side of the body to connect the same to the column 6, in spaced relation to the related surface of the column to provide an opening for the reception of the leg 8 of angle bracket 7.

The inner side of bar 10 is substantially the same construction as the bar shown in my prior Patent No. 2,540,408, being provided with a central downwardly curved surface 12 which is engaged by the leading edge of lug 13 carried by the inner face of leg 8 for gradually forcing the leg towards the column 6 to establish a forced interfitting connection between the leg 8 and bar 10. The edge of the lug opposite its leading edge is formed as a shoulder 13a. The construction of the leg and bar as shown in my prior patent required considerable pressure on the beam 5 to drive the leg into interfitting engagement with the bar which is time consuming. It has been found that by providing the bar portion 10 with an arcuate inwardly formed recess 14 opening at the bottom and outer walls of the bar, said recess having its depth of greatest magnitude adjacent the downwardly curved surface 12, the resilience of the bar 10 under pressure of the locking tongue is increased to a considerable degree without decreasing the strength of the bar. Moreover, the ends of the bar forming the arms 11 retain normal bar thickness. The relatively thin resilient web resulting from this construction forms a keeper portion 14a adapted to be engaged by the aforesaid shoulder 13a on the leg 8.

Also the outer face of leg 8 is provided with a concavity 15 of greater area opposite the lug 13 which covers a greater area of the leg than the lug so that the leg in the area surrounding the lug has greater spring allowing the lug to more easily enter the opening between the bar and beam.

In the ordinary course of erecting the structural framework, the columns 6 with the yokes 10 previously welded in position on the column 6 are erected in place.

The beams 5 while on the ground, or in a shop have the horizontal leg of the angle bracket 7 welded thereto, at each end with the leg 8 projecting at right angles to the attaching face of the beam. The beam is then lifted by a crane sling, and, when in a slightly off horizontal position, one of the legs 8 of bracket 7 is placed in a related yoke 10, with its locking shoulder 13a engaged behind the keeper shoulder of 14a of the yoke 10.

After this action, the other end of the beam is readily lifted the small distance required to position bracket 7 with the leading edge of lug 13 over the curved surface 12 of the yoke 10. From this position the beam is lowered so that the lug 13 of bracket 7 slides downward over surface 12 of yoke 10 until a temporary position is reached which holds the leading edge of lug 13 in proper alignment and slightly entered into, and bearing on, the inner face 12 of yoke 10. In this situation, the leading edge of lug 13 will not enter further into the opening of the yoke because of the width of the lug at the location of its beveled locking face 13a on the down standing dished leg 8.

At this point, the sling still being attached to the beam 5, a man with a heavy maul, hammers the top flange of the beam 5 thereby forcing the leading edge of the dished out toe of lug 13 completely through the opening in the yoke 10. This hammer action forces the leading edge of the toe of leg 8 and lug 13 to slide over the surface 12 of yoke 10 to deform 10 outward, and, at the same time, the toe edge of lug 13 and the dished leg 8 to deform inward until such time as the leg 8 is positioned in correct location in yoke 10, which position is determined by the fact that the surface 12 and the leading edge of lug 13 have reshaped back to their original condition due to the original metal deformation forming the cavity 15 being within the elastic limit of the material. This leaves the upwardly facing locking shoulder 13ª projecting beyond the opening edge 14ª of the yoke 10, without damage to either piece due to the necessary driving action to get them into correct final position relative to each other, leaving the locking shoulder 13ª projecting beyond the holding edge 14ª of yoke 10 to prevent separation, the downturned leg of the bracket 7 having mutual bearing surfaces with yoke 10 to hold it in proper horizontal position, so it cannot tilt sideways, or move forward or backward.

After once being seated, it becomes difficult to remove unit 7 from its final position in unit 10, for in the final position, the wedge action which develops between the outside faces of the front and back of leg 8 and the inside surfaces of the opening in yoke 10 must be loosened, then, due to these same wedging faces which still position leg 8 in yoke 10, an attempt to lift leg 8 from yoke 10 is resisted by the engagement of the surface 13ª against 14ª.

The condition developing from such lifting effort is the reverse from the condition when the dished leg 8 enters into the slot provided by the face of the column and the yoke 10. Under this lifting condition, and because bracket 7 is firmly held in horizontal position by the freed wedging surfaces between the leg 8 and the wedging surfaces in the slot in 10, no movement but an upward movement is possible. It is not possible to develop this upward movement beyond a fraction of space existing before the locking edge 13ª of leg 8 comes in contact with edge 14ª of yoke 10. The contact of these two edges under lift condition is quite the reverse of what happened through deformation action in the entering position.

Under this condition of uplift, in which the dished out leg 8 is firmly held in horizontal position by engaged facing surfaces, the uplift is resisted by the locking shoulder 13ª bearing against 14ª. Thus, the horizontal bar portion of yoke 10 acts as a fixed end beam to resist this uplift, and, the unindented reinforced portions of leg 8 of bracket 7 develop similar action towards resisting flexibility of much the same nature as the portions of the dished areas resist bending. Hence, for 13ª to pass 14ª in the upward movement, the action which develops on the edge 14ª is one of shearing between these two edges, and, because of the length of the surface of shoulder 13ª against edge 14ª deformation will not develop, but rather friction and a tendency to shearing action develops. However, for the purpose of this invention the yoke 10 is of sufficient strength to safely prevent the edge of shoulder 13ª being pulled past the edge 14ª of yoke 10.

By actual test it has been found that by providing the bar 10 with the recess 14 and the leg 8 with the concavity 15 of greater area than the locking lug, the connection between these members can be made with considerable less pressure applied to beam 5, and without weakening the connection beyond the requirements of structural steel engineering practices. It is apparent that the resilience of the connection will be increased if only one of the parts of the unit is made in accordance with my invention and it is intended that one or both of the parts may be made in accordance with the disclosure.

It is to be understood that the form of my invention herein shown and described is to be taken as a preferred example of the same and changes in the shape, size and arrangement of the parts may be made without departing from the spirit of the invention or scope of the subjoined claims.

I claim:

1. An erection seat connecting structural elements constituted by a beam and a column, comprising, in combination, a bracket including a beam attaching leg and a right angularly disposed locking leg provided on its outer face with an offset lug having a shoulder facing toward the attaching leg and also provided on its face opposite the lug with a cavity of greater area than the lug to give it resiliency, and a U-shaped yoke including a bar portion having its ends secured to the column and the medial section of the bar portion having a horizontally disposed recess providing a thinned keeper portion adapted to yield upon engagement by the lug to place its shoulder behind said thinned keeper portion.

2. An erection seat connecting structural elements constituted by a beam and a column, comprising, in combination, a bracket including a beam attaching leg and a right angularly disposed locking leg provided on its outer face with a medially disposed offset locking lug having a shoulder facing upwardly toward the attaching leg and also provided on the face opposite the lug with a cavity extending vertically and horizontally above and about the area of the lug on the opposite face, thereby to provide said right angularly disposed leg with inherent resiliency in the zone of the lug, and a U-shaped yoke including a horizontal bar portion having its ends secured to the column and the medial section of the bar portion having a horizontally disposed recess providing a thinned keeper portion adapted to yield upon engagement by the lug to place its shoulder behind said thinned keeper portion.

3. As an article of manufacture, a bracket element for attachment to beams to be connected with columns, comprising, right angularly disposed attaching and connector legs, a lug on said connector leg having a locking shoulder disposed within the included angle of said leg, and said connector leg having a concavity on its face opposite the lug, said concavity having its depth of greatest magnitude substantially in the zone of the lug to render the lug resilient under pressure.

4. As an article of manufacture, a yoke element for attachment to columns supporting beams, comprising a U-shaped body having a medial bar portion presenting top, bottom, inner and outer walls, arms offset from the same side of said inner wall, said bar portion having a recess opening at the junction of said bottom and outer walls and extending longitudinally of the bar portion between limits defining the inner end of the arms and also being of inwardly arcuate formation with its depth of greatest magnitude extending toward the outer wall to provide a relatively thin resilient keeper shoulder.

References Cited in the file of this patent

UNITED STATES PATENTS

| | | |
|---|---|---|
| 1,320,969 | Beadle | Nov. 4, 1919 |
| 2,231,297 | Saxe | Feb. 11, 1941 |
| 2,540,408 | Saxe | Feb. 6, 1951 |
| 2,624,429 | Saxe | Jan. 6, 1953 |

FOREIGN PATENTS

| | | |
|---|---|---|
| 690,030 | Great Britain | Apr. 8, 1953 |